United States Patent
Oelert (10) Patent No.: US 10,445,307 B2
(45) Date of Patent: Oct. 15, 2019

(54) VALIDATOR DEVICE FOR A TICKETING SYSTEM

(71) Applicant: Scheidt & Bachmann GmbH, Mönchengladbach (DE)

(72) Inventor: Kai Oelert, Willich (DE)

(73) Assignee: Scheidt & Bachmann GmbH, Mönchengladbach (DE)

(*) Notice: Subject to any disclaimer, the term of this patent is extended or adjusted under 35 U.S.C. 154(b) by 275 days.

(21) Appl. No.: 15/607,865

(22) Filed: May 30, 2017

(65) Prior Publication Data

US 2017/0351725 A1 Dec. 7, 2017

(30) Foreign Application Priority Data

Jun. 1, 2016 (EP) ..................................... 16172462

(51) Int. Cl.
| | | |
|---|---|---|
| *G06F 17/30* | (2006.01) | |
| *G06F 16/23* | (2019.01) | |
| *B60R 25/102* | (2013.01) | |
| *G06Q 20/20* | (2012.01) | |
| *G06Q 20/32* | (2012.01) | |
| *G07F 7/08* | (2006.01) | |

(Continued)

(52) U.S. Cl.
CPC ........ *G06F 16/2322* (2019.01); *B60R 25/102* (2013.01); *G06Q 20/045* (2013.01); *G06Q 20/208* (2013.01); *G06Q 20/3278* (2013.01); *G06Q 30/06* (2013.01); *G07F 7/0893* (2013.01)

(58) Field of Classification Search
CPC .. G06F 20/045; G06F 20/208; G06F 20/3278; G06F 30/06; G07F 7/08; G07F 7/0893

USPC .................................................. 250/221, 556
See application file for complete search history.

(56) References Cited

U.S. PATENT DOCUMENTS

| 2006/0183462 A1 | 8/2006 | Kolehmainen | |
| 2014/0298016 A1* | 10/2014 | Ekberg .................. | G06F 21/335 |
| | | | 713/168 |
| 2015/0025921 A1 | 1/2015 | Smith ............................... | 705/5 |

(Continued)

FOREIGN PATENT DOCUMENTS

| EP | 2 930 696 A1 | 10/2015 | ............. G07B 15/04 |
| FR | 2 915 606 A1 | 10/2008 | ............... G07C 9/00 |
| WO | WO 2014/174142 A1 | 10/2014 | ............. G07B 11/00 |

OTHER PUBLICATIONS

European Patent Office, European Search Report—Application No. EP 16172462.0-1958, dated Aug. 2, 2016, 8 pages (In German).

(Continued)

*Primary Examiner* — Kevin K Pyo
(74) *Attorney, Agent, or Firm* — Sunstein Kann Murphy & Timbers LLP (57) ABSTRACT

A validation device for a ticketing system having at least one first short-range interface that is configured to receive at least one inspection identifier stored in an inspection element, at least one authentication module configured to verify the authenticity of the received inspection identifier, and at least one key module configured to provide a communication dataset to a second short-range interface in the case of a positive authentication result, such that the communication dataset is receivable by the inspection element via the first short-range interface and/or an additional interface of the validator device.

12 Claims, 4 Drawing Sheets

(51) Int. Cl.
*G06Q 20/04* (2012.01)
*G06Q 30/06* (2012.01)

(56) References Cited

U.S. PATENT DOCUMENTS

2015/0294286 A1  10/2015  Grote ................... G06Q 20/145
2016/0078415 A1   3/2016  Ekberg et al. ..... G06Q 20/0453

OTHER PUBLICATIONS

European Patent Office, Office Action—Application No. 16 172 462.0-1222, dated Jan. 23, 2018, 8 pages (In German).

* cited by examiner

VALIDATOR DEVICE FOR A TICKETING SYSTEM

The present application claims priority from European patent application no. 16172462.0, filed Jun. 1, 2016, the disclosure of which is hereby incorporated herein by reference in its entirety.

TECHNICAL FIELD

The invention relates to a validator device for a ticketing system, in particular for an open ticketing system. Furthermore, the invention relates to an inspection element for an inspection device, an inspection device, an inspection arrangement, a ticketing system and a method, in particular for operating a ticketing system.

BACKGROUND ART

In addition to proprietary media ("closed loop" systems), ticketing systems increasingly use so called open media ("open loop" systems). There are also hybrid ticketing systems. The advantage of open architectures over closed architectures is, in particular, that they are more flexible. Users and passengers, respectively, can use different user identification elements such as tokens, chip cards (smart cards), credit cards, mobile phones, personal digital assistants (PDAs), tablet PCs, integrated circuit boards, electronic passports, electronic identification documents, etc. for authentication and billing when using a vehicle, in particular a transport vehicle. It is understood that the operator of a ticketing system can specify which user identification elements can actually be used, and which are excluded.

Ticketing systems based on an open architecture are described in US 2009/0121016 A1 and in WO 2012/088582 A1, for example. Such a ticketing system can be installed, for example, in a vehicle, such as a (public) bus or a (public) rail vehicle.

To use the vehicle, a user can sign on when entering the vehicle by means of a user identification element at a validator device arranged in (or in front of) the vehicle (on-board validation) or in front of the vehicle, and sign out in a corresponding manner when leaving the vehicle. The validator device can have at least one short-range interface that is configured to receive an identifier stored in the user identification element from the user identification element. The read identifier can be used by the ticketing system to identify a user and, for example, to charge for the use of the vehicle for the distance travelled between entry and exit.

A user dataset that comprises at least all relevant data to charge for the use of the vehicle is created in the validator device for every read identifier. The user dataset can be at least partially hashed. The validator device has a communication module for transmitting the user datasets to a remotely located central computing device (also called "back office"). A mobile data network can be used for transmission, for example. The remotely located central computing device in the form of one or more servers stores all user datasets, and can perform or at least initiate a usage accounting.

In order to at least reduce the misuse of a transport system, vehicle users are checked by inspectors inside the vehicle, for example. Using an inspection device to check or inspect is known from the prior art.

When using proprietary media as a user identification element, a validator device can document a compliant validation by changing the user identification element. In the simplest case, this is a ticket stamp on a paper ticket that an inspector can visually check. Relevant validation data is written onto electronically readable proprietary user identification elements, e.g. proprietary magnetic stripe tickets or proprietary smart cards, during validation so that the proper use can be read electronically by an inspector directly from the user identification element by means of an inspection device.

When using open media as user identification elements, this inspection is more difficult since it is generally not permissible for a validation device to write onto the user identification element, for example a contactless credit card. The information as to whether a user identification element (before departure) has been validated in a compliant manner is thus not present on the user identification element itself. In order to provide an assessment as to whether a user identification element has been validated in compliance with the rules, an inspection device must know, preferably "in real time", which user identification elements were used on the ticketing system's validation devices.

The inspection device therefore comprises an additional communication module and a short-range interface for an inspection process. The identifier is read from the user's user identification element to-be-inspected via the short-range interface. With the communication module, the inspection device downloads user datasets from the remotely located central computing device via a mobile data connection and locally stores or accesses them. The inspection device then compares a read identifier with the user data. If the comparison result is negative it concludes misuse, and appropriate measures can be taken. If the comparison result is positive it concludes an authorised user.

In ticketing systems of this kind, the problem repeatedly encountered during the inspection process is that the inspection leads to a false negative result. One reason that an identifier read from an identification device cannot be assigned to a user dataset is a delay in the transmission of a user dataset from the validator device to the computing device. Typically, it can take up to 5 minutes from the reading of an identifier from an identification element until a user dataset for this identifier has actually been received by the remotely located central computing device. Therefore, before this, the inspection device also has no access to this user dataset, which can result in a false negative inspection result.

Another reason of an erroneous inspection result could be that no communication link, or only an inadequate one, can be established between the inspection device and the remotely located central computing device. This can happen, for example, when a vehicle passes through geographic areas in which the mobile data network used is only available in an inadequate quality.

It is therefore the object of the invention to provide a validation device for a ticketing system that improves the reliability of the inspection results of an inspection method.

SUMMARY OF THE INVENTION

According to an embodiment of the invention, a validator device for a ticketing system comprises at least one first short-range interface configured to receive at least one inspection identifier stored in an inspection element. The validator device comprises at least one authentication module configured to verify the authenticity of the received inspection identifier. The validator device comprises at least one key module configured to provide a communication dataset that enables access to a data network in the event of a positive authentication result, such that the communication dataset can be received by the inspection element.

By providing, in contrast to the prior art, an inspection element with a communication dataset for accessing a secure data network, the communication dataset can be used to establish an additional, secure communications link between the validator device and an inspection device, in particular to transmit (current) user datasets, which are stored in the validator device, to the inspection device. A communication link between the inspection device and a remotely located (central) computing device can be omitted. Elaborate key management for the secure communication link can also be dispensed with. At the same time, the reliability of inspection results of an inspection method can be improved.

The validator device can be part of a ticketing system and arranged, for example, inside a vehicle or outside a vehicle, such as in the entrance area of a bus stop, train station, airport, etc. A vehicle can be any vehicle of a passenger transport system whose (temporary) use by a passenger or user requires authentication. Exemplified and non-exhaustive vehicles include road vehicles, such as buses or cars, rail vehicles such as commuter trains, trams, subways, water craft, or planes. The ticketing system is based, in particular, on an open architecture or a hybrid system comprising an open and closed ticketing system.

The validator device comprises a first short-range interface configured to receive at least one inspection identifier stored in an inspection element. An inspection identifier is, in particular, a unique identifier, for example a character code that is clearly assigned to the inspection element and/or the inspector. Preferably, the inspection identifier can be irreversibly stored in a first memory unit of the inspection element.

According to a preferred embodiment, the first short-range interface can be an NFC (near-field communication) interface. Due to the high transmission reliability of NFC connections, an NFC interface is preferred. An NFC interface and/or connection can be operated in accordance with the requirements of the Open Standard for Public Transport (OSPT) Alliance. An infrared interface, Bluetooth interface, WLAN interface, etc. can also be used for the first short-range interface as an alternative to an NFC interface. As another alternative, the first short-range interface can be implemented as a wired data interface that operates a data dialogue between the inspection device and the validator device. This wired data interface could be, for example, a USB, RS232, RS485 interface, wired LAN or a proprietary, wired data interface.

Upon receipt of the inspection identifier, the validator device performs an authentication check. Preferably, a positive list of inspection identifiers can be stored in the validator device. An authentication module, in particular in the form of a comparison module, can check the authenticity of the received inspection identifier by matching the received inspection identifier with the stored inspection identifier. In this case, a positive authentication result occurs when it is detected that a stored inspection identifier corresponds to the received inspection identifier. Otherwise, the authentication result is negative.

The positive list can be made updatable. In particular, in the event of loss of an inspection element, for example, the list can be updated accordingly. The update can be controlled by a remotely located central computing device. It is understood that other authentication checks can be performed alternatively or additionally.

In particular, a key module of the validator device provides a communication dataset only in the case of a positive authentication result. The communication dataset comprises information for (secure) access to a data network, such as a Bluetooth network or a WLAN network. The ticketing system, for example, in particular the validator device (but also a separate communication device of the ticketing system) can have an additional interface. The communication dataset can in particular comprise data necessary for establishing a short-range communication link with the additional short-range interface. The additional interface can preferably be a short-range interface, which provides a higher data transmission rate, in particular compared to a first short-range interface, such as an NFC interface. The additional short-range interface is preferably a WLAN interface. Alternatively, the second short-range interface can be a different interface, such as a Bluetooth interface.

The communication dataset is provided by the key module in such a way that it can be received by the inspection element, in particular via the first short-range interface and/or an additional interface of the validator device. Preferably, the communication dataset can be provided in such a way that it is transmitted from the first short-range interface to a short-range interface of the inspection element that corresponds to the first short-range interface. In particular, a first short-range connection established to transmit the inspection identifier can also be used to transmit the communication dataset.

Alternatively or additionally, the validator device may have an additional interface. For example, provision can be made for a different short-range interface or a display as an additional interface. Thus, the communication dataset can be shown on a display in the form of a QR (Quick Response) code.

In order to easily distinguish a received inspection identifier from a different identifier, corresponding information can also be transmitted together with the identification identifier and/or the inspection identifier itself can comprise corresponding information.

The validator device can be configured to (conventionally) read an identifier stored in a user identification element. The identifier can be an identification identifier that is unambiguously assigned to the user of the user identification element and/or the user identification element. Preferably, the first short-range interface, in particular an NFC interface, can be configured to read user identification elements. Alternatively or additionally, the validator device can comprise one or more additional interface(s) for this purpose. The validator device generates a user dataset based on a received identifier and preferably additional data, such as the time the identifier was received (time stamp) and/or the location (e.g., stop). The user dataset may comprise additional security elements. This user dataset is stored in a memory module of the validator device and preferably transmitted via a communication module to the remotely located central computing device for further processing. The central computing device can then, for example, check the user data and initiate a charge. A comparison of a received identifier with the identifiers stored in the negative list (only) can be carried out in the validator device by means of an (updatable) negative list, in particular to reject the use of a user identification element if its identifier is present on the negative list.

In addition, the validator device according to one embodiment can comprise a memory module for storing at least one user dataset corresponding to an identifier received from a user identification element. The memory module can be configured to provide the at least one stored user dataset, such that the at least one user dataset can be received over the data network by an inspection device. A user dataset to be transmitted can at least partially comprise information corresponding to the identifier and/or the identifier itself. In particular, the user dataset is suitable for checking a read identifier from a user identification element in an inspection process. Preferably, all user datasets can be transmitted in the form of a list by means of the data network, such as a WLAN data network. For example, the data can be transmitted via the additional interface, in particular a WLAN interface. The at least one memory module, which is comprised by the validator device, may be integrated in a housing of the validator device and/or arranged outside the validator device and connected to the validator device via a (wired) communication link.

According to one embodiment of the validator device according to the invention, the communication dataset can comprise at least one data network identifier of the data network. For example, the data network identifier can be a data network ID (identifier) and/or interface ID of the additional interface and/or an interface address of the additional interface of the validator device. In a preferred WLAN (Wireless Local Area Network, also known as WiFi) data network, the communication dataset may comprise a static SSID (Service Set Identifier). To increase security, a partially randomized SSID or a randomised SSID can be used instead of the static SSID. The communication dataset also preferably comprises at least one cryptographic key. The key can be a password, in particular a randomly generated password (e.g., WLAN password, Bluetooth password). Communication security for the additional communication link can be further increased as a result.

In principle, the data network, in particular the additional interface of the validator device, can be deactivated for safety reasons in normal operation. In particular, this prevents unauthorized entry into the data network. In order to use the data network, in particular for transmission of preferably all (current) user datasets stored in the memory module of the validator device, the validator device according to a preferred embodiment can comprise at least one activation module configured to activate the data network, such as the additional interface, after a positive authentication result. More preferably, the activation time can be limited. According to an embodiment of the validator device according to the invention, the activation module for activating the data network, such as the additional interface, can be configured for a predetermined time period. The predetermined time period can in particular depend on an estimated and/or tested maximum number of user datasets, on their respective size, and on the available data transmission rate. The time period can be between 2 mins and 15 mins, in particular between 3 mins and 10 mins. Alternatively or additionally, provision can be made for the data network, as well as the additional interface, to be deactivated automatically or on the basis of a corresponding message from the inspection device after the transmission of the last current user dataset. This ensures that, on the one hand, the data network is activated for a time period sufficient for transmission of all user datasets and, on the other hand, the data network is deactivated again after the data transmission.

Alternatively or additionally, provision can be made for the data network or the additional interface to be hidden for other devices.

In the practice of an inspection process, the problem arises that a user who uses a vehicle without authorization can still quickly hold their user identification element to a validator device when they spot an inspector. In order to prevent this, it is proposed according to a further embodiment that the validator device comprises at least one blocking module for blocking the reception of an identifier stored in a user identification element after a positive authentication result of the inspection identifier. Preferably immediately (at least <10 s, in particular at least <2 s) after creation of the positive authentication result, a control module of a validator device can be activated for example via the first and/or an additional short-range interface in order to block additional identifiers of user identification elements from being read.

The blocking module can preferably be configured to transmit a blocking message to at least one additional, preferably all, validator device(s) connected to the validator device of the blocking module. This causes blocking to preferably affect all validator device(s) of a ticketing system, such as a ticketing system installed in a vehicle. After the end of the inspection process, reception can be triggered again by the inspection device, for example via an additional short-range connection (e.g. a WLAN connection) or by renewed reading of an inspection identifier (with additional manual confirmation by an inspector, if necessary). The blocking can also be cancelled at the next stop. Preferably, provision can be made for the blocking module, upon detecting the opening of a vehicle door, to enable the reception of identifiers of user identification elements. Subsequently, an inspection element can start the inspection process by reading an inspection identifier in the manner described above and, for example, cause a new blocking.

A further aspect of the invention is an inspection element for an inspection device. The inspection element comprises at least one first memory unit for storing at least one inspection identifier. The inspection element comprises at least one short-range interface for transmitting the inspection identifier to a first short-range interface of a validator device. The inspection element is configured to receive at least one communication dataset from the validator device that is provided by the validator device and enables access to a data network.

Exemplified and non-exhaustive inspection elements include in particular, tokens, chip cards (smart cards), mobile phones, personal digital assistants (PDAs), tablet PCs, integrated circuit chips, electronic passports, electronic identification documents or the like. An inspection element (or a user identification element) can operate according to the MIFARE smart card technology or the international e-ticketing system standard Calypso.

The inspection element has a first memory unit that stores at least the inspection identifier. In particular, the inspection identifier is irreversibly programmed into the memory unit.

The short-range interface of the inspection element is configured to produce a first short-range connection with a first short-range interface of a validator device described above in particular. The short-range interface of the inspection element is preferably an NFC interface. In particular, the NFC interface of the inspection element can be a passive NFC interface. In this case, the first NFC interface of the validator device is designed as an active NFC interface. It is understood that NFC communication between two elements can be performed in different modes (active/passive mode, peer-to-peer mode and card emulation mode) and the interfaces involved can be configured accordingly.

The stored inspection identifier is transmitted to the validator device via the short-range interface of the inspection element. The inspection element preferably receives the above-described communication dataset via its short-range interface. Alternatively or additionally, provision can be made for an additional interface to be used to detect the communication dataset.

A short-range interface of the inspection element can, in particular, be understood as a short-range interface of another device (e.g. an inspection device) that can be used by the inspection element. The inspection element can be integrated in the other device, for example. The same applies to a possible additional interface.

According to a first embodiment of the inspection element according to the invention, the inspection element can be configured to provide the received communication dataset such that the communication dataset can be received by the inspection device (in particular via the short-range interface of the inspection element and/or an additional interface of the inspection element). In particular, an NFC connection can be established between the NFC interface of the inspection element and an NFC interface of an inspection device. The communication dataset can be read from the additional memory unit and transmitted to the inspection device via the NFC interface. Alternatively or additionally, the previously described additional short-range interface of the inspection element can be used as an additional interface for the transmission. In the event that the inspection element is integrated in an inspection device, the additional interface can be an internal (wired) interface (e.g., a bus) between the inspection element and the inspection device.

In order to make the inspection element as simple as possible, the inspection element can preferably only have one short-range interface, in particular an NFC interface.

A still further aspect of the invention is an inspection device for a ticketing system. The inspection device comprises at least one first interface configured to receive at least one communication dataset from a validator device that enables access to a data network. The inspection device comprises at least one second interface configured to establish a communication link with the data network based on the received communication dataset. The second interface is configured to receive at least one user dataset from the validator device via the established communication link.

The first interface of the inspection device is in particular configured to receive the communication dataset from the inspection element. The interface can be an internal (wired) interface when the inspection element is integrated in the inspection device, or a short-range interface when the inspection element is set up as a separate element. The short-range interface of the inspection device can preferably be an NFC interface.

Furthermore, the inspection device includes a second interface for establishing a communication link with the data network. In particular, the second interface of the inspection device can correspond to the additional short-range interface of the validator device or another communication device. The previously described data of the previously received communication dataset is used in order to establish a communication link with the data network. After the communication link has been established, the inspection device in particular can initiate the transmission of the at least one user dataset, preferably of all (relevant) user datasets. In particular, a proprietary protocol can be used for this purpose. Relevant user datasets are, in particular, all user datasets of the last X hours, the last n-stops or the like. The at least one limit value can be predetermined.

A further aspect of the invention is an inspection arrangement for a ticketing system comprising at least one inspection element described above and at least one inspection device described above.

The inspection arrangement can be made up of an inspection device with a (fixed) integrated inspection element or two separate elements. A separate inspection element can be used for one or more inspection device(s). An inspection element is viewed, in particular, by an inspection device as a trustworthy entity. In particular, provision can be made for a bidirectional status of trust between the inspection element and the inspection device.

A still further aspect of the invention is a ticketing system. The ticketing system, in particular an open ticketing system or a hybrid ticketing system, comprises at least one previously described validator device and at least one previously described inspection arrangement. Preferably, the ticketing system according to the invention can be based on a pre-installed ticketing system and, in particular, use the pre-existing interfaces (NFC and WLAN).

A ticketing system can include two or more validator devices. In a vehicle, at least one validator device can be arranged in each entrance area of the vehicle, for example. Preferably, at least two, preferably all, validator devices of a ticketing system are connected to one another via a wired and/or wireless connection. According to one embodiment, user datasets can be synchronized between at least two, preferably all, validator devices. Corresponding data synchronization can be carried out at specific times, in particular on a regular basis. This ensures that preferably every validator device has all current user datasets. This allows all current user datasets to be received, in particular downloaded, by an inspection device from any validator device.

In the event that one or more validator devices are integrated in an access arrangement (gate), e.g. a train station, provision can be made for current user datasets to be transmitted regularly, in particular almost continuously, during an inspection process to an inspection device via the additional communication link to the data network. In particular, the user datasets of an access arrangement can be synchronized with several validator devices, as described above. This allows an inspector to perform at least a random sampling of identification elements in an area behind the entrance gate.

A further aspect of the invention is a method. The method comprises:
  checking an inspection identifier received from an inspection element via a first short-range communication link by means of an authentication module of a validator device,
  transmitting a communication dataset that enables access to a data network to at least one inspection device upon a positive authentication result,
  establishing a communication link with the data network based on the transmitted communication dataset, and
  transmitting at least one user dataset that is stored in a memory module of the validator device to the inspection device via the established communication link.

The method, in particular a ticket inspection method, can preferably be used to operate a previously described ticketing system. The communication dataset can preferably be transmitted (indirectly) to the inspection device using the inspection element. Direct transmission could also be possible. For example, a communication dataset in the form of a QR code can be detected directly from a visual interface of the inspection device.

A module or a unit can be at least partially made up of software and/or at least partially of hardware. In particular, a device/element may comprise appropriate computing elements (e.g., processor, memory, etc.).

The features of the methods, systems, arrangements, elements and devices can be freely combined. In particular, features of the description and/or of the dependent claims, even with complete or partial circumvention of the features of the independent claims, can be independently inventive when stand alone or freely combined.

There are a multitude of possibilities for further development of the inventive validator device, the inventive inspection element, the inventive inspection device, the inventive inspection arrangement, the inventive ticketing system and the inventive method. Reference is made, on the one hand, to the claims that are subordinate to the independent claims, and on the other hand, to the description of exemplary embodiments in conjunction with the drawing.

BRIEF DESCRIPTION OF THE DRAWINGS

Identical reference symbols are used for the same elements below.

DETAILED DESCRIPTION OF SPECIFIC EMBODIMENTS

Figure 1:
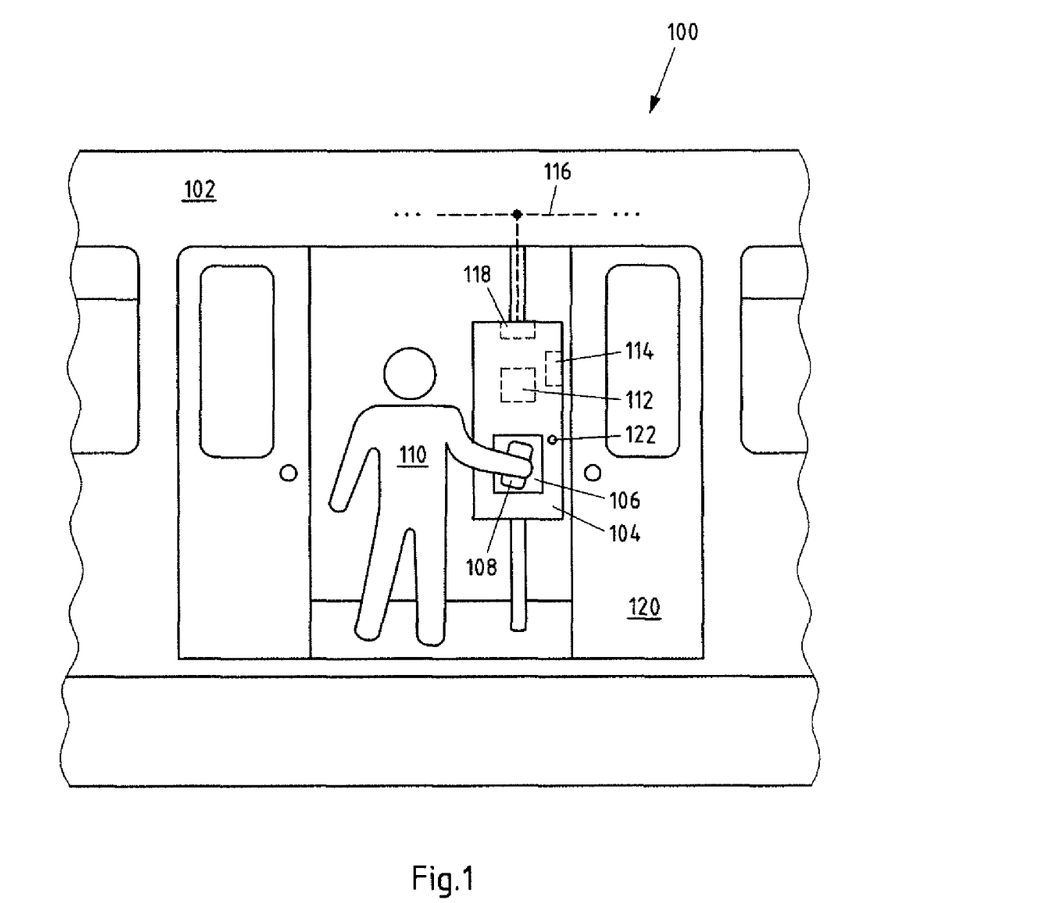
FIG. 1 is a schematic view of a first embodiment of a ticketing system according to the present invention.

FIG. 1 shows a first exemplary embodiment of a ticketing system 100 according to the present invention. As can be seen in FIG. 1, a validator device 104 is arranged in a vehicle 102, in particular a rail vehicle 102. The validator device 104 is arranged in an entrance area, in particular in the vicinity of a vehicle door 120 of the vehicle 102.

The validator device 104 comprises a first short-range interface 106 in the form of an NFC interface 106. The NFC interface 106 is in particular configured to send a reading field. If an additional NFC interface (not shown) of a user identification element 108 reaches the range of the reading field, the NFC interface 106 can read an identifier stored in the user identification element 108 and receive it from the user identification element 108, respectively. The identifier can be assigned (unambiguously) to a user 110 of the user identification element 108. A read identifier can be stored as a user dataset in a memory module 112 of the validator device 104 together with other data, such as a time stamp, location (e.g., entry and/or exit stop). In other variants, a memory module of a validator device can also be arranged outside the housing of the validator device and, for example, be linked to the validator device via a wired connection.

The user datasets are preferably stored and handled in accordance with PCI (Payment Card Industry) standards.

Furthermore, the validator device 104 comprises a communication module 114 configured to transmit the at least one user dataset to a remotely located central computing device (not shown). The computing device is in particular configured to initiate a charge for at least the use of the vehicle. For example, a user account can be debited depending on the kilometers travelled.

Furthermore, the illustrated rail vehicle 102 comprises additional validator devices (not shown). Preferably, all of the validator devices 104 are connected by a wired communication link 116, such as a vehicle data-bus 116, by means of corresponding wired interfaces 118. The validator devices 104 can exchange data with one another via the wired communication link 116. In particular, every validator device 104 implemented in the vehicle 102 is preferably configured to at least synchronize the user datasets stored in the respective memory modules 112 with one another. Through the synchronization process, it can be ensured that preferably every validator device comprises all user datasets relevant to the vehicle 102. The synchronization process can preferably be performed at certain times, e.g. every X seconds.

In normal operation, provisions have particularly been made for the following procedure for the ticketing system 100. A user 110 entering the vehicle 102 validates himself with the user identification element 108 on the validator device 104 ("tap-in"). A positive validation can be displayed to the user 110 via an optical element 122 (e.g., an LED or a screen) for example, and/or an acoustic element. A user dataset is then created by the validator device 104. The validation process can, for example, comprise a check as to whether a generally permissible identifier has been received. In addition, the received identifier can be compared with a negative list. A positive validation occurs, in particular, if a permissible identifier has been received.

The user dataset is stored in the memory module 112. Furthermore, the user dataset is transmitted to a remotely located central computing device. Upon exiting the vehicle 102, the user 110 again brings his user identification element near the NFC interface 106 so that the identifier is read ("tap-out") by the NFC interface 106. The user dataset stored for the identifier can be adapted or an additional user dataset can be created. The user dataset is transferred to the remotely located central computing device for further processing. In particular, a charge for the use of the vehicle can then be carried out in the back office.

Figure 2:
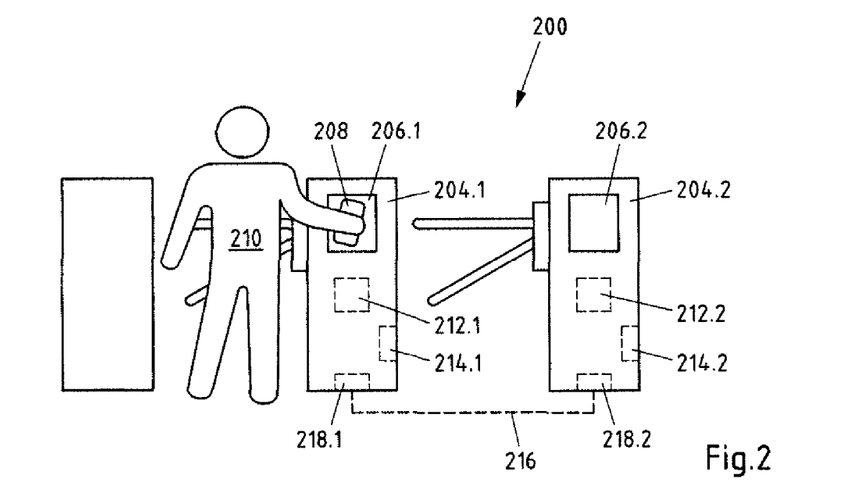
FIG. 2 is a schematic view of an additional embodiment of a ticketing system according to the present invention.

FIG. 2 shows a further schematic view of a ticketing system 200 according to the present invention. The illustrated ticketing system 200 comprises two validator devices 204.1, 204.2. The validator devices 204.1, 204.2 are, in particular, part of an access arrangement for a specific area. Such an access arrangement can be arranged in a station, for example.

In the present example, two turnstiles are arranged, each comprising a turnstile body and two or more wings mounted to the body. The turnstile body can in particular comprise a validator device. It is understood that, according to other variants, provision can be made for other access arrangements, such as visitor gates or the like.

A validator device 204.1, 204.2 can (according to the validator device 104 described above) have a first short-range interface 206.1, 206.2 in the form of an NFC interface 206.1, 206.2, a memory module 212.1, 212.2, a communication module 214.1, 214.2, and a wired interface 218.1, 218.2. In the present case, the validator devices 204.1, 204.2 are linked to one another via a wired communication link 204.1, 204.2.

In order to enter an area restricted by the access arrangement, a user 210 can validate his identification element with a validator device 204.1, 204.2. In the case of a positive validation result, the turnstile is opened and the user 210 can pass the access arrangement. The remaining steps are essentially equal to the procedure already described in relation to FIG. 1.

Figure 3:
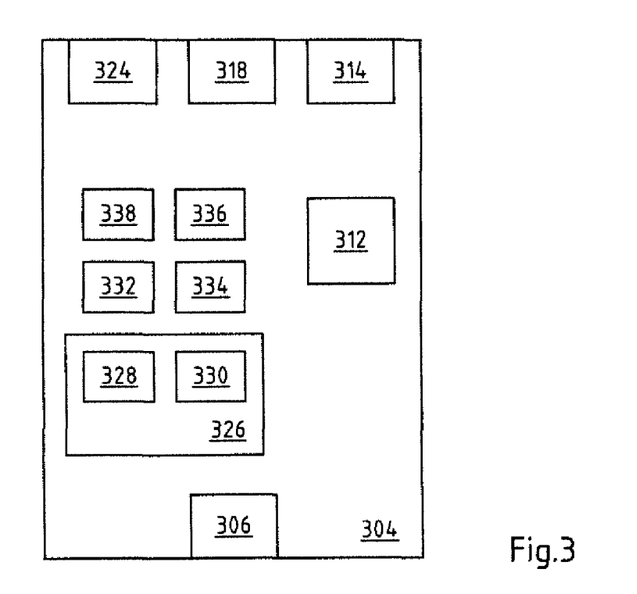
FIG. 3 is a schematic view of further embodiment of a ticketing system according to the present invention.

FIG. 3 shows a block diagram of an exemplary embodiment of a validator device 304 according to the present invention. The illustrated validator device 304 can, for example, be used as a validator device 104 or 204 in the above-described ticketing systems.

The validator device 304 comprises a first short-range interface 306 in the form of an NFC interface 306. The NFC interface 306 is configured to receive an inspection identifier from an inspection element. The inspection element described in more detail below can comprise a third short-range interface in the form of an NFC interface for transmitting the inspection identifier.

A received inspection identifier is provided to an authentication module 326. The authentication module 326 in the present case comprises a comparison module 328. The comparison module 328 is configured to compare, in an authentication process, a received inspection identifier with authorized inspection identifiers stored in a memory module 330. If authentication is positive, the comparison module 328 can cause a key module 332 to provide a communication dataset. The communication dataset preferably comprises a data network identifier for a data network, which can be generated by a further interface 324, such as further short-range interface. In addition, the communication dataset can comprise a key for the data network. In addition to an arrangement of the further short-range interface 324 in the validator device 304, a connection to an externally arranged further short-range interface is also conceivable. In the case of a WLAN interface 324, a static SSID of the WLAN data network and a random WLAN password, which can be generated by the key module 332, can be provided as a communication dataset.

The communication dataset can be provided such that it can be detected by the inspection element. Preferably, the communication dataset can be transmitted to the inspection element via the first short-range interface 306, in the present case the NFC interface 306.

The validator device 304 further includes an activation module 334. The activation module 334 is configured to activate the further short-range interface 324, formed here as a WLAN interface 324, only after positive authentication. The data network is only activated after a positive authentication. Preferably, the WLAN interface 324 can be activated by the activation module 334 for a predetermined time period (e.g., between 0.5 min and 10 mins from positive authentication). The activation module 334 can be coupled to a timer module 336 for this purpose. After the predetermined time period has expired, the WLAN interface 324 can be deactivated again.

Optionally, the validator device 304 has a blocking module 338. The blocking module 338 is configured to (temporarily) block the first short-range interface 306 from receiving identifiers stored in user identification elements. In other words, the validator device 304 is placed in an inspection mode which prevents (subsequent) validation by a user.

Figure 4:
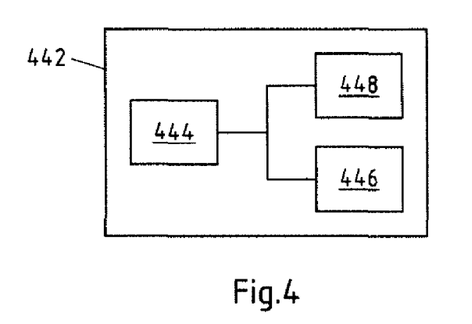
FIG. 4 is a schematic view of further embodiment of an validator device according to the present invention.

In addition, FIG. 4 shows a block diagram of an exemplary embodiment of an inspection element 442 according to the present invention. In this case, the inspection element 442 is in the form of a smart card 442. The smart card 442 comprises a short-range interface 444 that at least corresponds to a first short-range interface of a validator device. The short-range interface 444 can preferably be an NFC interface 444.

Via the short-range interface 444, an inspection identifier stored in a first memory unit 446 can be transmitted to the first short-range interface of the validator device, in particular be read by the validator device. The first memory unit 446 is preferably a tamper-proof memory unit 446 in the form of a tamper-proof read-only memory 446.

In addition, the smart card 442 comprises an additional, writeable memory unit 448. A previously described communication dataset can preferably be received via the short-range interface 444, wherein said dataset can be (temporarily) stored in the memory unit 448. Preferably, the short-range interface 444 is also configured to provide the communication dataset to an inspection device via an interface corresponding to the short-range interface 444.

Figure 5:
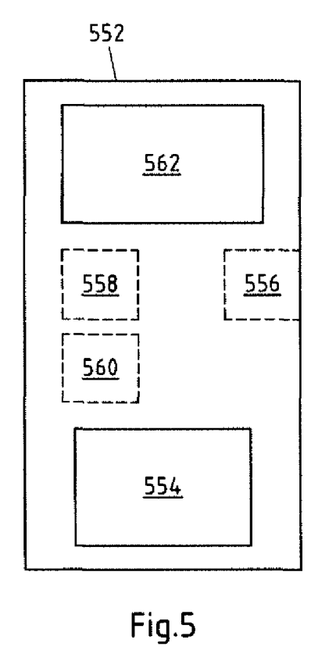
FIG. 5 is a schematic view of an embodiment of an inspection element according to the present invention.

FIG. 5 shows a block diagram of an exemplary embodiment of an inspection device 552 according to the present invention. The inspection device 552 comprises a first interface, in particular a short-range interface 554 in the form of an NFC interface 554. In the present case, the NFC interface is configured to communicate with user identification elements as well as with the inspection element. It is understood that provision can be made for two or more different interfaces to communicate with the elements.

The short-range interface 554 of the inspection device 552 is configured to receive at least the communication dataset from the inspection element. In particular, the NFC interface 554 can be configured to read the communication dataset.

Furthermore, the inspection device 552 can comprise a second interface, such as an interface 556 in the form of a WLAN interface 556. The communication dataset can be provided to the WLAN interface 556. By means of the SSID and the random password of the provided communication dataset, the inspection device 552, in particular the WLAN interface 556, can establish a WLAN communication link to the data network, and in particular to the WLAN interface of the validator device.

After establishing the additional communication link with the data network, the inspection device 552 can trigger the transmission of preferably all user datasets stored in the memory module of the validator device. The transmitted user datasets can be stored in a memory module 558 of the inspection device 552. The inspection process can then begin.

During the inspection process, the identifier stored in a user identification element can be read by means of the NFC interface 554. The read identifier can be provided to a comparison module 560. The comparison module 560 is configured to compare the read identifier with the user datasets stored in the memory module 558. If an identifier corresponds to a user dataset, this can be shown, for example, via a display module 562 in the form of a display 562. When a read identifier cannot be allocated to a user dataset, this can be displayed in a corresponding manner.

Figure 6:
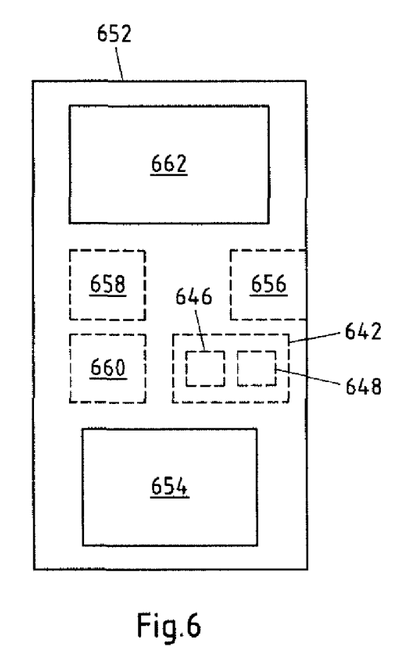
FIG. 6 is a schematic view of an embodiment of an inspection device according to the present invention.

FIG. 6 shows a schematic view of an exemplary embodiment of an inspection device 652 with an integrated inspection element 642.

The inspection element 642 in this embodiment, in contrast to the inspection device 552 according to FIG. 5, is (fixedly) integrated in the inspection device 652 for example in the form of a secure card element 642. In addition to this difference, the inspection device 652 and the inspection element 642 in this case only have one shared, usable first short-range interface 654.

Figure 7:
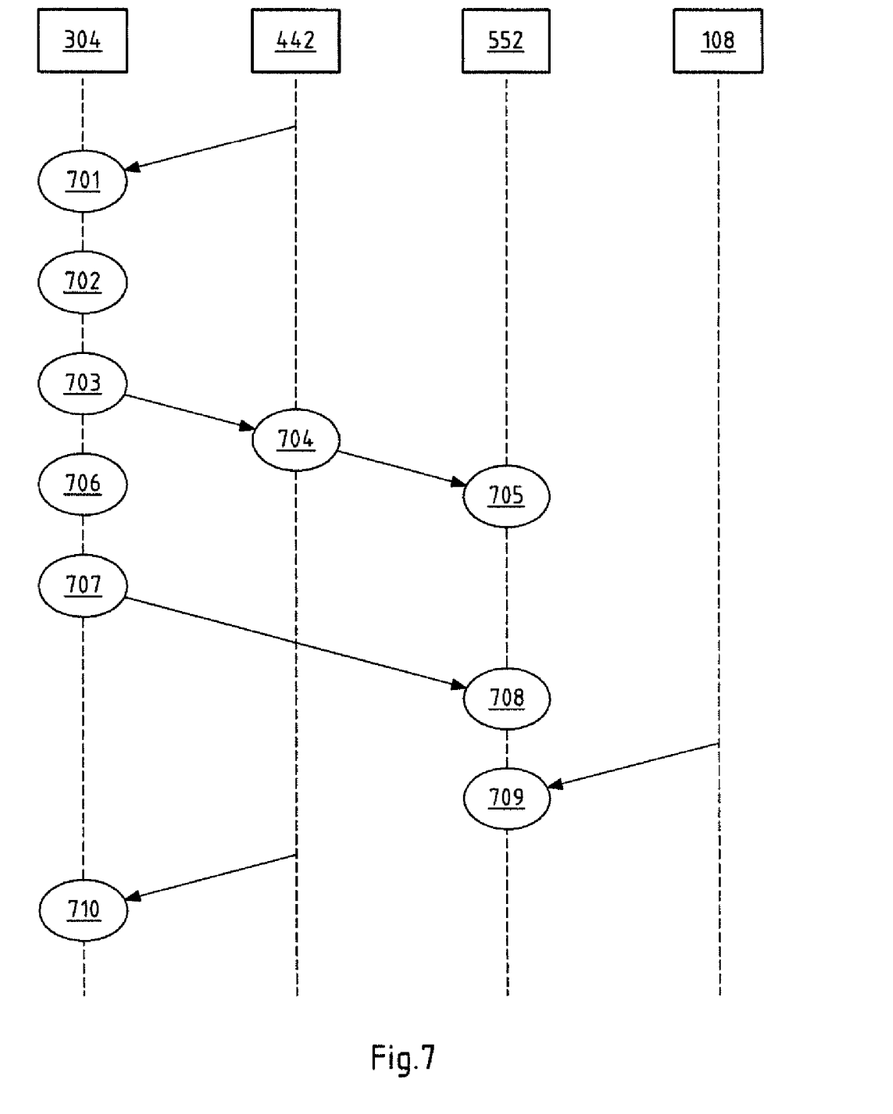
FIG. 7 is a diagram of an embodiment of a method according to the present invention.

An exemplary operation of a ticketing system is described in more detail below with the aid of FIG. 7, wherein the ticketing system 552 comprises a plurality of validator devices 304 according to FIG. 3, which are installed in a vehicle, an inspection element 442 according to FIG. 4 and an inspection device according to FIG. 5. FIG. 7 shows an exemplary embodiment of a method according to the present invention. The method is, in particular, an exemplary inspection method.

First, an inspection identifier is received by the validator device 304 (step 701). Preferably, the NFC interface 306 can send a reading field with a limited range (0 to a few centimeters). An inspector can bring his inspection element 442 within the range of the reading field so that its stored inspection identifier is read from the NFC interface 306 of the validator device 304 via the NFC interface 444 of the inspection element 442. In other words, the inspection identifier is transmitted from the inspection element 442 to the validator device 304. It is understood that the transmission can be encrypted.

Upon receiving the inspection identifier, the inspection identifier is evaluated in step 702. In particular, an authentication test is performed by an authentication module 326 of the validator device 304. Preferably, a comparison module 328 checks whether the received inspection identifier corresponds to one of a plurality of authorized inspection identifiers stored in a memory module 330. If the authentication result is negative, the process can be stopped.

In the case of a positive authentication result, a communication dataset can be provided in step 703. The communication dataset can preferably comprise at least one data network identifier, such as an address or an ID of the data network or the additional short-range interface 324 of the validator device 304, and a cryptographic key for the data network provided by the additional short-range interface 324. In a preferred embodiment of the further short-range interface 324 as WLAN interface 324, the data network identifier can be an SSID of the WLAN data network and the cryptographic key can be a random WLAN password generated by a key module 332.

In the next step 704, the communication dataset is received by the inspection element 442. In particular, the communication dataset can be transmitted from the validator device 304 to the inspection element 442 via the (pre-established) NFC connection. It is understood that the transmission can be encrypted. The communication dataset can then be stored in the further memory unit 448 of the inspection element 442.

It is understood that the dataset can also be transmitted through other means in accordance with other variants of the invention. For example, the communication dataset can be provided by the validator device in the form of a QR code on a display of the validator device. The inspection element and/or the inspection device can have a visual detection module for detecting the QR code.

In the next step 705, the inspection device 552 receives the communication dataset from the inspection element 442. For example, an inspector can bring the inspection element 442 into the range of an interface 554 in the form of a short-range interface 554 of the inspection device 552. Preferably, the short-range interface 554 is also an NFC interface 554 that emits a reading field with a limited range (0 to a few centimeters). The communication dataset can then be transmitted from the inspection element 442 to the inspection device 552 via the NFC connection.

Preferably in parallel to steps 704 and 705, the blocking module 338 can, after positive authentication, block the reception of further identifiers stored in user identification elements in step 706. For example, the first short-range interface 306 can be blocked from receiving further identifiers. If the ticketing system comprises two or more validator devices, the blocking module 338 can cause all validator devices to block the receipt of other identifiers stored in user identification elements. In particular, the blocking module 338 can cause transmission of a corresponding message via the wired communication link 116. It is understood that reception of additional inspection identifiers is not blocked.

In addition, activation of the data network is initiated in step 707, for example, by activating the WLAN interface 324 by means of an activation module 334. In particular, the WLAN interface 324 can be deactivated for safety reasons in normal operation. The WLAN interface 324 is activated only after a positive authentication of an inspection identifier. Preferably, the WLAN interface 324 and thus the WLAN is activated only for a predetermined time period. The time period can be predetermined in such a way that it is sufficient for transmitting all user datasets always to the inspection device 552. It is understood that the WLAN interface 324 can be temporarily activated for additional applications.

It is also understood that this step can be dispensed with. This can be the case, in particular, if the WLAN interface is permanently active, but the SSID is hidden from other devices.

In the next step 708, the inspection device 552 can preferably receive all the user datasets stored in the memory module 312 of the validator device via the data network. After the WLAN interface 324 is activated, the WLAN interface 556 of the inspection device 552 can establish a secure WLAN connection with the WLAN data network by means of the received communication dataset (e.g., SSID and random password). All (current) user datasets are then transferred to the inspection device 552 via the WLAN connection, and stored in the memory module 558. For transmission, the inspection device 552 can use a proprietary protocol (e.g., REST call) to receive the list of user datasets.

In the case that a ticketing system comprises two or more validator devices, the above-described synchronization process can ensure that every validator device has stored all current user datasets in almost real time. The inspection device can therefore receive all updated user datasets of the ticketing system in step 708 and store them locally.

Subsequently, the (actual) inspection process can begin, and the respective user identification elements 108 of the passengers can be checked (step 709). For this purpose, the respective identifier of a user identification element 108 can be read via the NFC interface 554 and compared with the locally stored user datasets, and an inspection result can be issued based on the comparison result.

After the inspection process has ended, the blocking module 338 can re-enable the reception of identifiers stored in user identification elements 108 in step 710. For example, the end of the inspection process can be communicated to the validator devices by a renewed reading of an inspection identifier or by pressing a function key. Alternatively or additionally, provision can be made for reception of identifiers stored in user identification elements 108 to be enabled automatically at the vehicle's next stop and/or after expiration of a predetermined time period. In the case that the WLAN interface 324 is still activated, termination information can be transmitted via the WLAN connection. After receiving corresponding information about the completion of the inspection process, the WLAN interface 324 can be deactivated.

However, it is understood that the reading of an identifier stored in a user identification element 108 can be blocked. Nevertheless, the reading of additional inspection identifiers is enabled. It is thus possible for other inspectors to participate in the inspection process and for the corresponding inspection devices to be able to obtain the user datasets from a validator device in a secure and correct manner.

It is also understood that some of the steps described above can at least be partially omitted, carried out in a different order or in parallel. It is also understood that, alternatively or additionally, the system can operate based on the EMV ("Europay, MasterCard, and Visa") standard.

It should be noted that user data can also be transmitted directly to an inspection element and/or an inspection device by means of the first short-range interface.

What is claimed is:

1. Validator device for a ticketing system, comprising:
at least one first short-range interface configured to receive an identifier stored in a user identification element;
at least one memory module configured to store at least one user dataset corresponding to the identifier received from the user identification element,
wherein the at least one first short-range interface is configured to receive at least one inspection identifier stored in an inspection element;
at least one authentication module configured to verify the authenticity of the received inspection identifier;
a second interface configured for communicating over a secured data network; and
at least one key module configured to provide a communication dataset enabling access to the secured data network in the event of a positive authentication result, such that the communication dataset is receivable by the inspection element.

2. Validator device according to claim 1, wherein the memory module is configured to provide the at least one stored user dataset, such that the at least one user dataset is receivable over the secured data network by means of an inspection device that has received the communication dataset.

3. Validator device according to claim 1, wherein the communication dataset comprises at least one data network identification of the secured data network.

4. Validator device according to claim 3, further comprising at least one activation module configured to activate the secured data network after a positive authentication result.

5. Validator device according to claim 4, wherein the activation module is further configured to activate the secured data network for a predetermined time period.

6. Validator device according to claim 1 further comprising at least one blocking module that is configured to block the reception of an identifier stored in a user identification element after positive authentication from the inspection identifier.

7. Inspection element for an inspection device comprising:
at least one first memory unit configured to store at least one inspection identifier; and
at least one short-range interface configured to transmit the inspection identifier to a first short-range interface of a validator device, wherein the validator device comprises at least one first short-range interface configured to receive an identifier stored in a user identification element and at least one memory module configured to store at least one user dataset corresponding to the identifier received from the user identification element, wherein the inspection element is configured to receive at least one communication dataset, that is provided by the validator device, the validator device configured to enable access to a secured data network.

8. Inspection element according to claim 7, wherein the inspection element is configured to provide the received communication dataset in such a way that the communication dataset can be received by the inspection device.

9. Inspection device for a ticketing system, comprising:
at least one first interface configured to receive at least one communication dataset from an inspection element; and
at least one second interface configured to establish a communication link with a secured data network based on the received communication dataset,
wherein the second interface is configured to receive at least one user dataset from a validator device via the established communication link,
wherein the inspection device is configured to conduct an inspection process, wherein during the inspection process an identifier read from a user identification element is checked using the at least one received user dataset.

10. Inspection arrangement for a ticketing system, comprising:
at least one inspection element including, at least one first memory unit configured to store at least one inspection identifier; and
at least one short-range interface configured to transmit the inspection identifier to a first short-range interface of a validator device,
wherein the inspection element is configured to receive at least one communication dataset, that is provided by the validator device, the validator device configured to enable access to the secured data network; and
at least one inspection device according to claim 9.

11. Ticketing system, comprising:
at least one validator device including,
at least one first short-range interface configured to receive at least one inspection identifier stored in an inspection element,
at least one authentication module configured to verify the authenticity of the received inspection identifier, and
at least one key module configured to provide a communication dataset enabling access to the secured data network in the event of a positive authentication result, such that the communication dataset is receivable by the inspection element, and
at least one inspection arrangement according to claim 10.

12. Method for operating a ticketing system, wherein the ticketing system comprises at least one validator device having at least one first short-range interface configured to receive an identifier stored in a user identification element and at least one memory module configured to store at least one user dataset corresponding to the identifier received from the user identification element, the method comprising:
checking an inspection identifier received from an inspection element via the at least one first short-range communication link by means of an authentication module of the at least one validator device;
transmitting a communication dataset that enables access to a secured data network to at least one inspection device upon a positive authentication result;
establishing a communication link with the secured data network based on the transmitted communication dataset;
transmitting at least one user dataset that is stored in a memory module of the at least one validator device to the inspection device via the communication link established; and
conducting an inspection process by the inspection device, wherein during the inspection process an identifier read from a user identification element is checked using the at least one received user dataset.

\* \* \* \* \*